(12) United States Patent
Shimizu

(10) Patent No.: US 6,655,361 B2
(45) Date of Patent: Dec. 2, 2003

(54) FUEL INJECTION CONTROL APPARATUS OF ENGINE

(75) Inventor: Hirokazu Shimizu, Atsugi (JP)

(73) Assignee: Unisia Jecs Corporation, Atsugi (JP)

( * ) Notice: Subject to any disclaimer, the term of this patent is extended or adjusted under 35 U.S.C. 154(b) by 42 days.

(21) Appl. No.: 10/100,085

(22) Filed: Mar. 19, 2002

(65) Prior Publication Data
US 2002/0129796 A1 Sep. 19, 2002

(30) Foreign Application Priority Data
Mar. 19, 2001 (JP) .................................. 2001-078197

(51) Int. Cl.⁷ .......................... F01L 1/34; F02M 55/00
(52) U.S. Cl. ................................... 123/500; 123/90.15
(58) Field of Search ......................... 123/90.15, 90.16, 123/90.17, 500, 501

(56) References Cited

U.S. PATENT DOCUMENTS

| | | | | |
|---|---|---|---|---|
| 5,143,030 A | * | 9/1992 | Ikeura | 123/90.16 |
| 5,692,464 A | * | 12/1997 | Kimura | 123/90.15 |
| 5,967,125 A | * | 10/1999 | Morikawa | 123/90.15 |
| 6,431,129 B1 | * | 8/2002 | Hammoud et al. | 123/90.15 |
| 2002/0148422 A1 | * | 10/2002 | Shiraishi | 123/90.15 |

FOREIGN PATENT DOCUMENTS

| | | |
|---|---|---|
| JP | 10-141022 | 5/1998 |
| JP | 11-218043 | 8/1999 |

* cited by examiner

Primary Examiner—Thomas N. Moulis
(74) Attorney, Agent, or Firm—Foley & Lardner

(57) ABSTRACT

In an engine equipped with a variable valve timing mechanism that variably controls the valve timing successively, when variably controlling the valve timing, a transient correction amount of fuel supplied to the engine is corrected based on the detection value of the valve overlap amount of the intake/exhaust valves.

19 Claims, 14 Drawing Sheets

FUEL INJECTION CONTROL APPARATUS OF ENGINE

FIELD OF THE INVENTION

The present invention relates to a technique of correcting and controlling with high accuracy a fuel injection quantity during transient operation when variably controlling valve timing, in an engine equipped with a variable valve timing mechanism.

RELATED ART

Heretofore, in a fuel injection control of an engine for vehicle, a transient correction is performed so as to suppress a change in air-fuel ratio caused by a change in a wall flow amount of fuel during a transient operation.

Japanese Unexamined Patent Publication No. 11-218043 discloses that a port wall flow amount of injection fuel adhered to an intake port, a cylinder wall flow amount of fuel adhered to an inner wall of a cylinder, and the like are computed to set a fuel injection quantity with high accuracy even during a transient operation when these wall flow amounts are changed.

On the other hand, there has been proposed an engine equipped with a variable valve timing control mechanism that successively and variably changes the valve timing (opening and closing timing) of intake and exhaust valves by changing a rotation phase of a camshaft relative to a crankshaft (Japanese Unexamined Patent Publication 10-141022).

According to the engine equipped with the above-mentioned variable valve timing mechanism, the valve timing is changed accompanied by a change in operating condition during a transient operation, thus a valve overlap amount of the intake/exhaust valves is changed. Therefore, when controlling a fuel injection quantity during the transient operation, a change in valve overlap amount influences a wall flow amount, but conventionally, a transient correction amount is adjusted (set) according to the change in operating condition during the transient operation including the valve overlap amount change.

However, as mentioned above in the case where the transient correction amount is adjusted according to the change in operating condition during the transient operation including the change in valve overlap amount, it is impossible to cope with variations in transient characteristic of the valve timing. In other words, when the operating condition is changed under the same conditions, if a response characteristic of an actual valve timing to a target valve timing does not fall under an allowable limit of response characteristic during the transient correction amount is adjusted, the fuel injection quantity cannot be set well due to the deviation of valve overlap change characteristic, and thus the transient operating performance and the exhaust emission performance are deteriorated due to the deviation of air-fuel ratio.

SUMMARY OF THE INVENTION

The present invention has been achieved in view of the above-mentioned problem and has an object to accurately controlling a fuel injection quantity during a transient operation where the valve timing is changed, without being influenced by the dispersion of response characteristic of a variable valve timing mechanism.

In order to achieve the above-mentioned object, the present invention is constituted so that, in an engine equipped with a variable valve timing mechanism that variably controls the valve timing successively, when variably controlling the valve timing, a transient correction amount of fuel to be supplied to the engine is corrected based on a detection value of a valve overlap amount of intake/exhaust valves.

According to this constitution, even if variations exist in a response characteristic in the valve timing control, the transient correction amount can be corrected based on the detection value of the valve overlap amount of the intake/exhaust valves, thereby enabling to perform a correction corresponding to a response delay, thus realizing the satisfactory transition operating performance.

The other objects and features of the present invention will become understood from the following description with reference to the accompanying drawings.

DETAILED DESCRIPTION OF PREFERRED EMBODIMENTS

Figure 1:
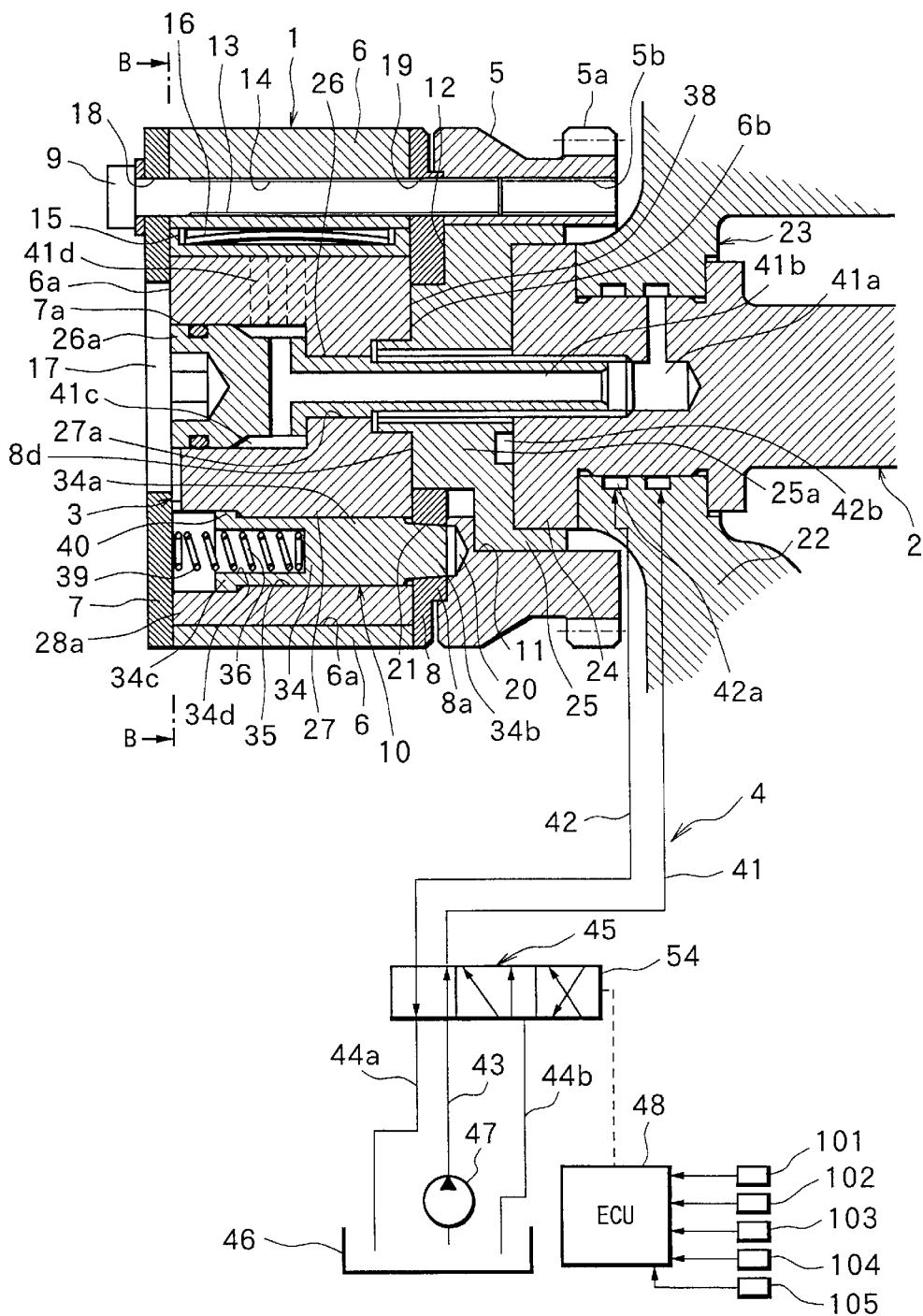
FIG. 1 is a sectional view of a valve timing control mechanism in an embodiment.
Figure 2:
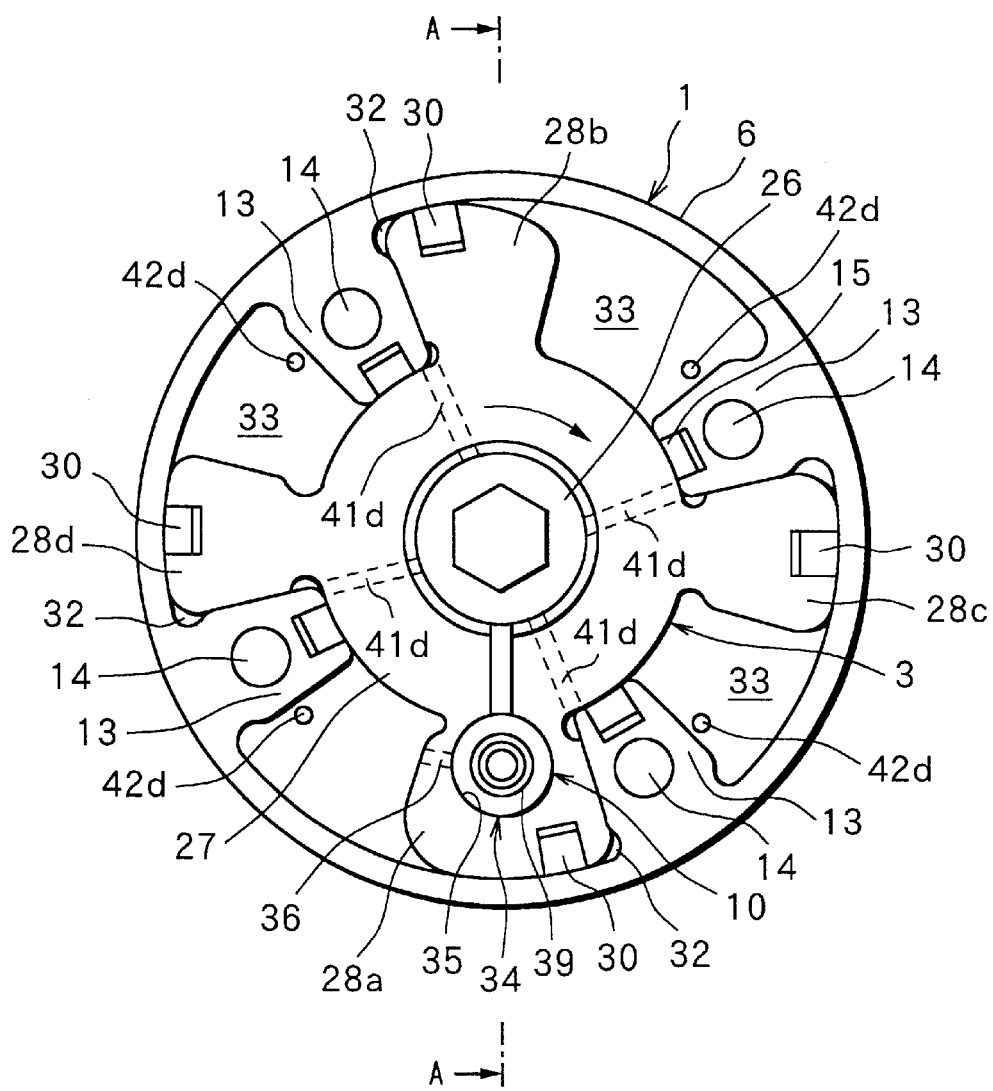
FIG. 2 is a sectional view taken along the line B—B in FIG. 1.
Figure 3:
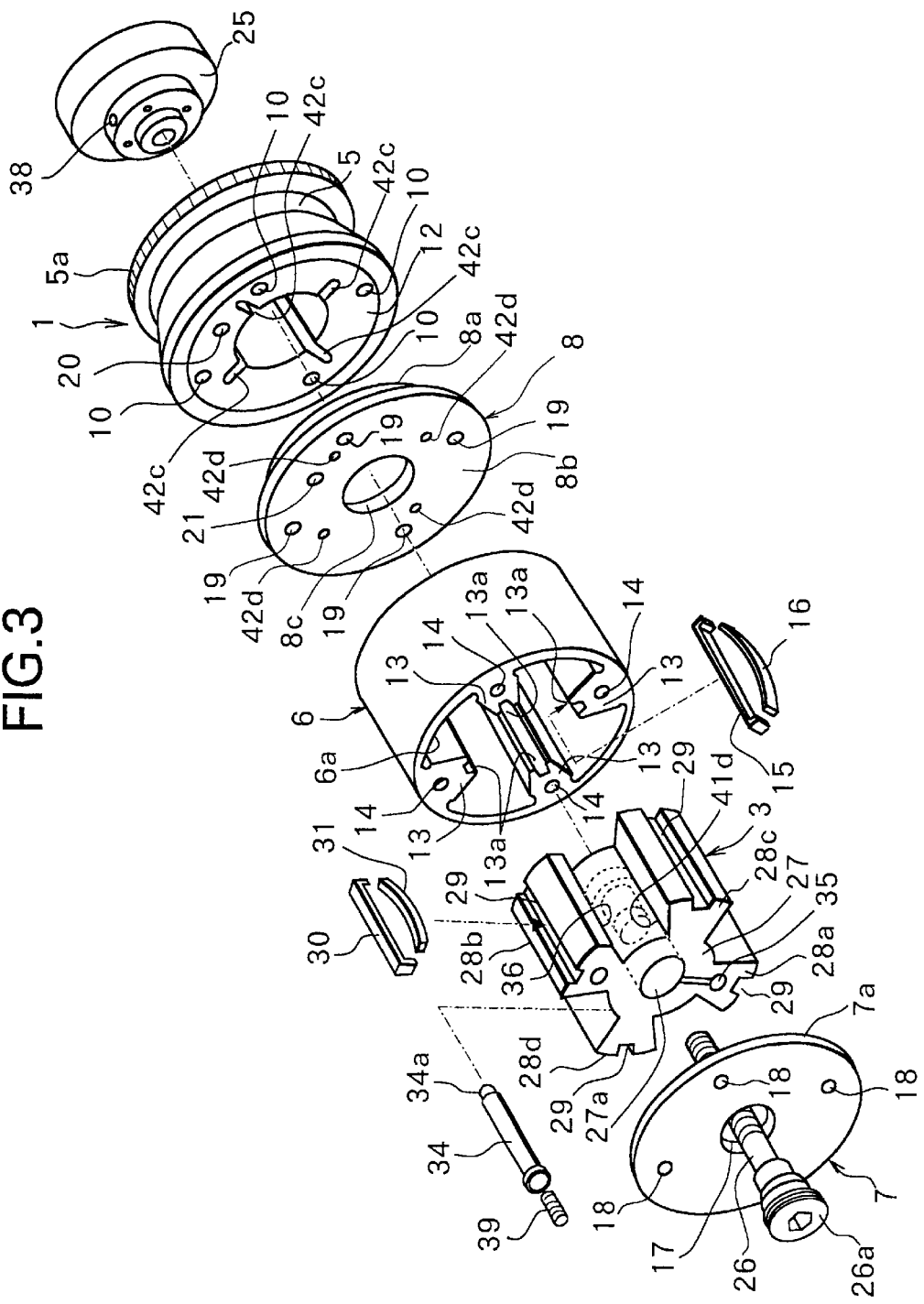
FIG. 3 is an exploded perspective view of the valve timing control mechanism.

The preferred embodiments of the present invention will now be explained.

In FIG. 1 to FIG. 6 showing a valve timing control apparatus provided in an engine, the valve timing control apparatus is equipped with a cam sprocket 1 (timing sprocket) driven to rotate through a timing chain by a crankshaft (not shown) of an engine (internal combustion engine), a camshaft 2 mounted to be rotatably relative to cam sprocket 1, a rotation member 3 fixed to an end of camshaft 2 to be received rotatably in cam sprocket 1, an oil pressure circuit 4 that rotates rotation member 3 relative to cam sprocket 1 and a lock mechanism 10 that selectively locks a relative rotation position of cam sprocket 1 and rotation member 3 at a predetermined position.

Cam sprocket 1 includes a rotation portion 5 having a tooth portion 5a that meshes with the timing chain (or timing belt) on the periphery thereof, a housing 6 disposed in the front of rotation portion 5 to rotatably receive rotation member 3, a disc-shaped front cover 7 which functions as a lid for closing a front end opening of housing 6 and a substantially disc-shaped rear cover 8 disposed between housing 6 and rotation portion 5 to close a rear end of housing 6. Rotation portion 5 is joined integrally with housing 6, front cover 7 and rear cover 8 by four small diameter bolts 9 in an axial direction.

Rotation portion 5 has a substantially annular shape on which four female screw holes 5b are through formed in the front-rear direction at equally spaced positions of 90 degrees in its peripheral direction. Small diameter bolts 9 are screwed to female screw holes 5b. Also, in the internal and central position of rotation portion 5, a stepped fitting hole 11 is through formed, to fit therein a sleeve 25 for forming a passage to be described later. Moreover, at the front end face of rotation portion 5, a disc-shaped fitting groove 12 is formed in which rear cover 8 is fitted.

Housing 6 has a cylindrical shape with the front and rear ends open, and at 90 degree positions in the peripheral direction of the inner peripheral surface thereof, four partition walls 13 are formed projectingly. Partition walls 13 have trapezoidal shapes in cross section and are disposed along the axial direction of housing 6. Both ends of each wall 13 are in the same plane with both ends of housing 6. At the base end side of housing 6, four bolt through holes 14 are through formed in the axial direction and small diameter bolts 9 are inserted therein. Further, at the central position of the internal face of each wall 13, a cut-out retaining groove 13a is formed within which a C-shaped sealing member 15 and a plate spring 16 urging sealing member 15 inwards are fittedly held.

Further, front cover 7 is formed with a relatively large diameter bolt through hole 17 at the center thereof and four bolt through holes 18 at the positions corresponding to respective bolt through holes 14 in housing 6.

Rear cover 8 is formed with a disc portion 8a held fittedly within fitting groove 12 of rotation portion 5 at the rear end face thereof. Rear cover 8 also has an insert hole 8c into which a small diameter annular portion 25a of a sleeve 25 is inserted at the center thereof and further four bolt through holes 19 at the positions corresponding to bolt through holes 14.

Camshaft 2 is supported rotatably through a cam bearing 23 at the tip end portion of a cylinder head 22, and at a predetermined position in the outer peripheral surface of camshaft 2, a cam (not shown in the figures) is integrally mounted to open an intake valve through a valve lifter and a flange portion 24 is integrally mounted to the front end portion of camshaft 2.

Rotation member 3 is fixed to the front end portion of camshaft 2 through a fixing bolt 26 inserted in the axial direction through sleeve 25 with the front and rear ends thereof fitted in flange portion 24 and fitting hole 11, respectively. Rotation member 3 is equipped with an annular base portion 27 having a bolt through hole 27a receiving fixing bolt 26 at the center thereof and with four vanes 28a, 28b, 28c, and 28d integrally mounted at 90 degree positions in the outer peripheral surface of base portion 27.

Each of first to fourth vanes (28a~28d) has a substantially inverted trapezoidal shape in cross section and is disposed in a recess portion between each of partition walls 13 to partition the recess portion in front and rear of the rotation direction. An advance angle side oil pressure chamber 32 and a retarded angle side oil pressure chamber 33 are defined between both sides of vanes 28a~28d and both side faces of partition walls 13. A sealing member 30 with C-shape sliding contact with an inner surface 6a of housing 6 and a plate spring 31 urging sealing member 30 outwards are fittedly held in a retaining groove 29 cut-out in the axial direction at the center of the peripheral surface of each of vanes 28a~28d.

Lock mechanism includes an engagement groove 20 formed at a predetermined position at the outer peripheral side of fitting groove 12 of rotation portion 5, a tapered engagement hole 21 through formed at a predetermined position of rear cover 8 corresponding to engagement groove 20, a hole for sliding 35 through formed along the internal axial direction at the substantially central position of one of vanes 28 corresponding to engagement hole 21, a lock pin 34 disposed slidably in hole for sliding 35 of the one of vanes 28, a coil spring 39 disposed in compressive state at the rear end side of lock pin 34, and an oil pressure receiving chamber 40 formed between lock pin 34 and hole for sliding 35.

Lock pin 34 includes an intermediate diameter lock body 34a at the center thereof, a conical engagement portion 34b with its front head being smaller in diameter at the front end side of lock body 34a and a stepped large diameter stopper portion 34c formed on the rear end side of lock body 34a. Lock pin 34 is urged in the direction of engagement hole 21 by the spring force of coil spring 39 disposed in compressive state between the bottom surface of an internal concave groove 34d and the inner end surface of front cover 7. Lock pin 34 slides in a direction to be taken out from engagement hole 21 by the oil pressure of oil pressure receiving chamber 40 defined between an outer peripheral surface between lock body 34a and stopper portion 34c, and the inner surface of hole for sliding 35. This chamber 40 is communicated with retarded angle side oil pressure chamber 33 through a through hole 36 formed in the side portion of vane 28. Engagement portion 34b of lock pin 34 is engaged with engagement hole 21 at the maximum retarded angle side rotation position of rotation member 3.

Oil pressure circuit 4 includes a binary system of the oil pressure passages, that is, a first oil pressure passage 41 which supplies and discharges oil pressure to advance angle side oil pressure chamber 32 and a second oil pressure passage 42 which supplies and discharges oil pressure to retarded angle side oil pressure chamber 33. Each of oil pressure passages 41, 42 is connected with a supply passage 43 and a drain passage 44 through an electromagnetic switching valve 45 for passage switching. Supply passage 43 is equipped with an oil pump 47 for supplying oil from an oil pan 46 under pressure while a downstream end of drain passage 44 is connected with oil pan 46.

First oil pressure passage 41 includes a first passage portion 41a formed in an inter-axis passing from cylinder head 22 to camshaft 2, a first oil path 41b which passes in the axial direction inside fixing bolt 26 and branches in head portion 26a to communicate with first passage portion 41a, an oil chamber 41c formed between a small diameter outer peripheral surface of head portion 26a and an inner peripheral surface of bolt through hole 27a in base portion 27 of rotation member 3 to communicate with first oil path 41b, and four branch paths 41d formed radially in base portion 27 of rotation member 3 to communicate with oil chamber 41c and each of advance angle side oil pressure chambers 32.

Second oil pressure passage 42 includes a second passage portion 42a formed in cylinder head 22 and in an inner side of camshaft 2, a second oil path 42b formed in a substantially L-shape inside sleeve 25 to communicate with second passage portion 42a, four oil passage grooves 42c formed at an outer peripheral side hole edge of engagement hole 11 of rotation portion 5 to communicate with second oil path 42b, and four oil holes 42d formed at approximately 90 degree positions in a circumferential direction of rear cover 8 to communicate each of oil passage grooves 42c with retarded angle side oil pressure chamber 33.

In electromagnetic switching valve 45, a spool valve body thereof performs relative switching control of each of oil pressure passages 41, 42 and supply passage 43 and drain passages 44a, 44b, relatively. Further, electromagnetic switching valve 45 is switchingly operated by a control signal from a controller 48.

Figure 4:
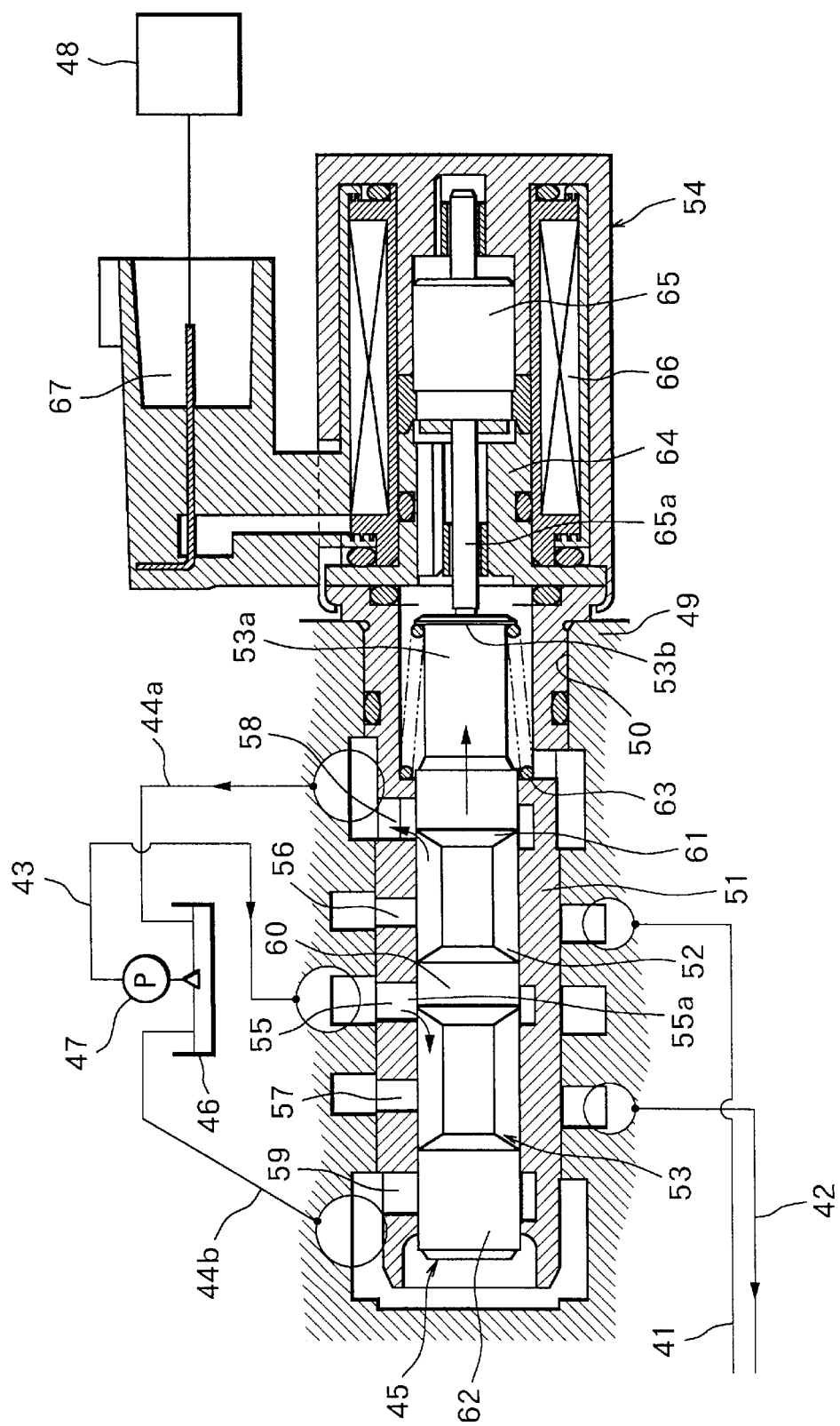
FIG. 4 is a longitudinal sectional view showing an electromagnetic switching valve in the valve timing control mechanism.
Figure 5:
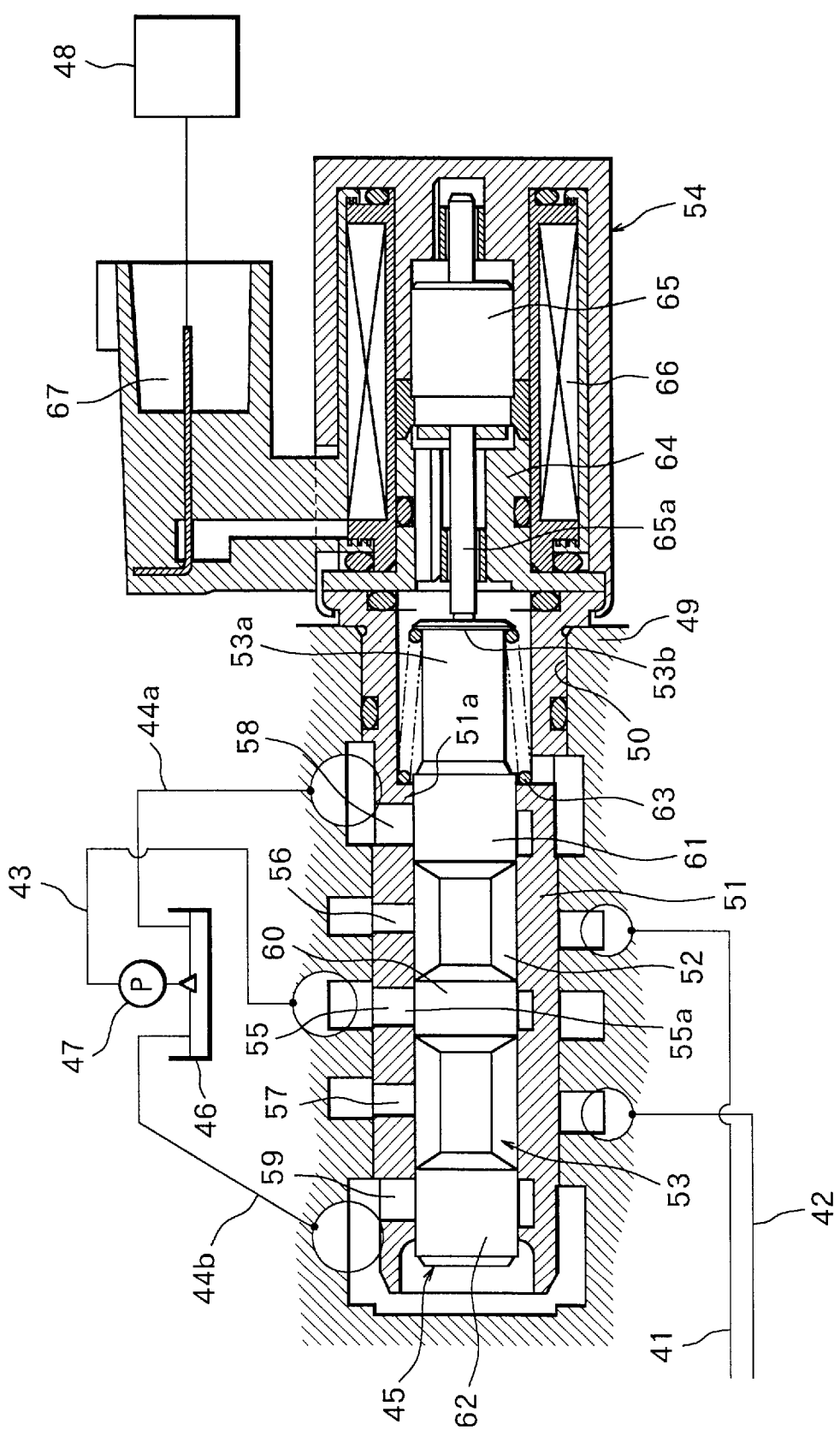
FIG. 5 is a longitudinal sectional view showing the electromagnetic switching valve in the valve timing control mechanism.
Figure 6:
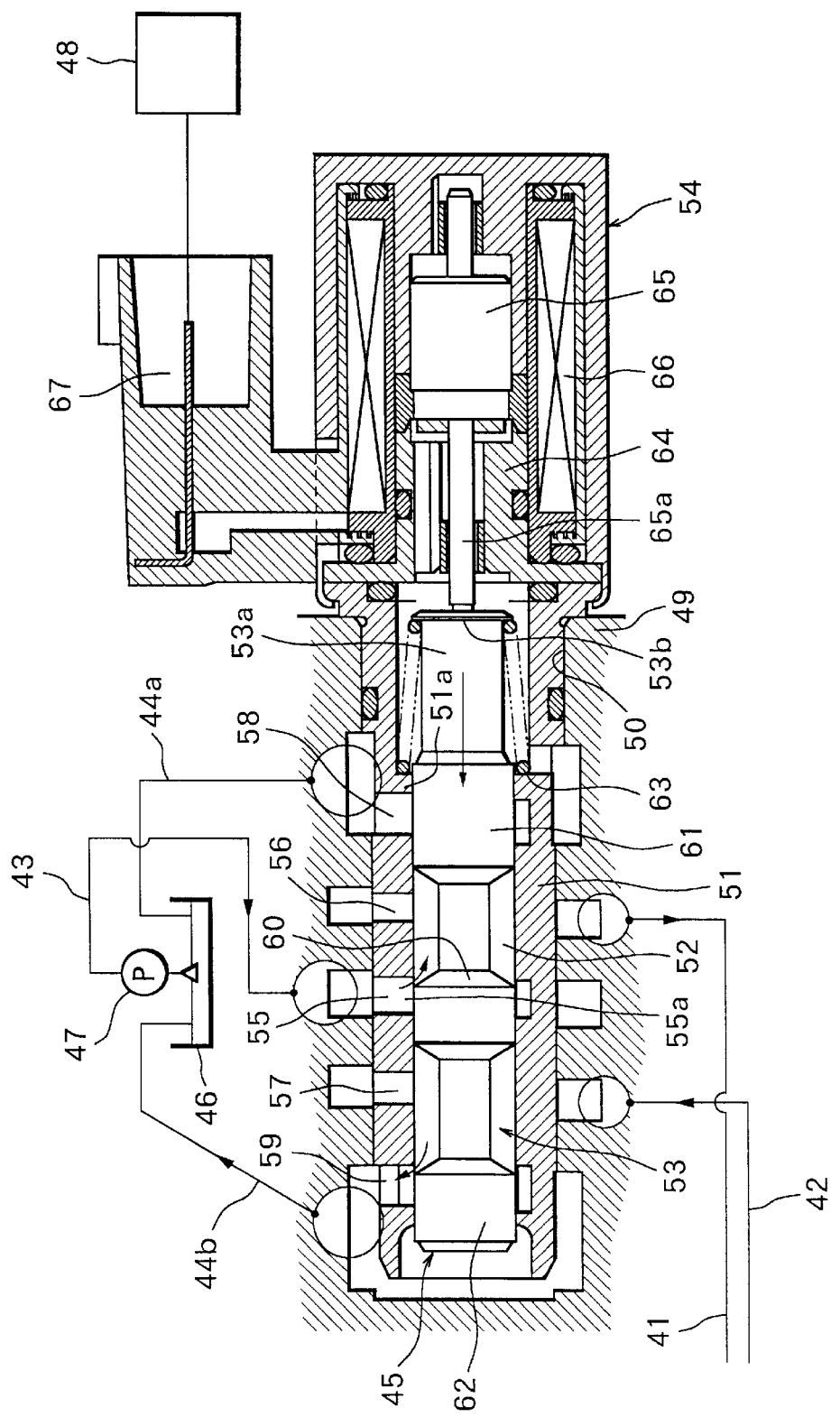
FIG. 6 is a longitudinal sectional view showing the electromagnetic switching valve in the valve timing control mechanism.

To be specific, as shown in FIG. 4 to FIG. 6, electromagnetic switching valve 45 includes a cylindrical valve body 51 inserted into and fixed to a holding hole 50 of a cylinder block 49, a spool valve body 53 slidably mounted inside a valve hole 52 in valve body 51 to switch flow path, and a proportional solenoid electromagnetic actuator 54 for operating spool valve body 53.

Valve body 51 includes a supply port 55 through formed at the substantially central position of the peripheral wall thereof to communicate a downstream end of supply passage 43 with valve hole 52, and first and second ports 56 and 57 through formed at both sides of supply port 55 to communicate the other ends of first oil pressure passage 41 and second oil pressure passage 42 with valve hole 52. At both ends of the peripheral wall, third and fourth ports 58 and 59 are through formed to communicate both drain passages 44a and 44b with valve hole 52.

Spool valve body 53 includes a substantially cylindrical first valve portion 60 for opening and closing supply port 55 at the center of a small diameter axis portion thereof, and substantially cylindrical second and third valve portions 61, 62 at both end portions thereof for opening and closing third and fourth ports 58, 59. Spool valve body 53 is urged in the right direction of the figure by a conical valve spring 63 disposed in compressive state between a cap portion 53b in one end of a support axis 53a at the front end side thereof and a spring sheet 51a at an inner wall of the front end side of valve hole 52 so that supply port 55 and second oil pressure passage 42 are in communication with each other by first valve portion 60.

Electromagnetic actuator 54 is equipped with a core 64, a moving plunger 65, a coil 66, a connector 67 and the like. At the front end of moving plunger 65 is fixed a driving rod 65a pressing cap portion 53b of spool valve body 53.

Controller 48 detects present operating conditions (load, rotation) by signals from a rotation sensor 101 detecting an engine rotation speed and from an airflow meter 102 detecting an intake air amount, and also detects a rotation phase of camshaft 2 relative to the crankshaft, that is, a relative rotation position of cam sprocket 1 and camshaft 2, by signals from a crank angle sensor 103 and a cam sensor 104.

Controller 48 controls the supply of electricity to electromagnetic actuator 54 based on a duty control signal.

For example, when controller 48 outputs a control signal (OFF signal) with a duty ratio of 0% to electromagnetic actuator 54, spool valve body 53 moves to the right position as shown in FIG. 4, that is, to a maximum right direction by spring force of valve spring 63. By this movement, first valve portion 60 opens an opening end 55a of supply port 55 for communicating with second port 57 and at the same time second valve portion 61 opens an opening end of third port 58 and fourth valve portion 62 closes fourth port 59. Therefore, operating oil supplied under pressure from oil pump 47 is sent to retarded angle side oil pressure chamber 33 through supply port 55, valve port 52, second port 57 and second oil pressure passage 42. Also, operating oil in advance angle side oil pressure chamber 32 is discharged into oil pan 46 from first drain passage 44a through first oil pressure passage 41, first port 56, valve hole 52, and third port 58.

Accordingly, an inner pressure of retarded angle side oil pressure chamber 33 becomes high and that of advance angle side oil pressure chamber 32 becomes low, thus rotation member 3 is rotated in one direction at a maximum through vanes 28a to 28d. Thereby, cam sprocket 1 and camshaft 2 are relatively rotated to one side and their phases are changed. As a result, the opening timing of the intake valve is delayed and overlapping with the exhaust valve gets smaller.

On the other hand, when an engine control unit (ECU) 48 that performs various engine controls outputs a control signal (ON signal) with a duty ratio of 100% to electromagnetic actuator 54, spool valve body 53 slides in the left direction at a maximum against a spring force of valve spring 63 as shown in FIG. 6. Consequently, third valve portion 61 closes third port 58, and at the same time fourth valve portion 62 opens fourth port 59 and first valve portion 60 communicates supply port 55 with first port 56. Therefore, the operating oil is supplied to advance angle side oil pressure chamber 32 through supply port 55, first port 56, and first oil pressure passage 41, while the operating oil in retarded angle side oil pressure chamber 33 is discharged to oil pan 46 through second oil pressure passage 42, second port 57, fourth port 59, and second drain passage 44b. As a result, the oil pressure of retarded angle side oil pressure chamber 33 gets lower.

Therefore, rotation member 3 is rotated in the other direction at a maximum through vanes 28a to 28d, by which cam sprocket 1 and camshaft 2 are relatively rotated to the other side and their phases are changed. As a result, the opening timing of the intake valve gets earlier (advanced) and overlapping with the exhaust valve gets larger.

ECU 48 sets, as a base duty ratio BASEDUTY, a duty ratio at a position where first valve portion 60 closes supply port 55, third valve portion 61 closes third port 58, and fourth valve portion 62 closes fourth port 59. On the other hand, ECU 48 sets a feedback correction component UDTY as described later, to coincide the relative rotation position (rotation phase) between cam sprocket 1 and camshaft 2 detected based on signals from crank angle sensor 103 and cam sensor 104 with a target value (target advance angle value) of the relative rotation position (rotation phase) set corresponding to operating conditions. ECU 48 also sets, as a final duty ratio VTCDTY, a result of adding the base duty ratio BASEDTY and the feedback correction component UDTY and outputs a control signal of the duty ratio VTCDTY to electromagnetic actuator 54.

In addition, the base duty ratio BASEDTY is set to about a central value (for example, 50%) in the duty ratio range within which supply port 55, third port 58 and fourth port 59 are all closed and there is no supply and no discharge of oil in both of oil pressure chambers 32, 33.

Namely, in the case the relative rotation position (rotation phase) is required to be changed into the retard angle direction, the duty ratio is decreased by the feedback correction component UDTY, the operating oil sent under pressure from oil pump 47 is supplied to retarded angle side oil pressure chamber 33, and the operating oil in advance angle side oil pressure chamber 32 is discharged into oil pan 46. On the other hand, in the case the relative rotation position (rotation phase) is required to be changed into the advance angle direction, the duty ratio is increased by the feedback correction component UDTY, the operating oil is supplied to advance angle side oil pressure chamber 32, and the operating oil in retarded angle side oil pressure chamber 33 is discharged to oil pan 46. In the case of holding the relative rotation position (rotation phase) at the current state, with the reduction of an absolute value of the feedback correction component UDTY, the duty ratio is controlled to be back close to the base duty ratio, and the inner pressure of each of oil pressure chambers 32, 33 is controlled to be held by closing of supply port 55, third port 58, and fourth port 59 (cease of supply and discharge of oil pressure).

Here, the feedback correction portion UDTY is computed by, for example, a normal PID control. In other words, the detected relative rotation position (rotation phase) of cam sprocket 1 and camshaft 2 is set as an actual angle VTCNOW of a variable valve timing mechanism (VTC), and a target value of the relative rotation position is computed as a target angle VTCTRG of VTC, and, a proportion component P, an integral component I, and a derivative portion D to the deviation VTCERR (=VTCNOW−VTCTRG) between the two angles, are computed to be used for control.

Figure 7:
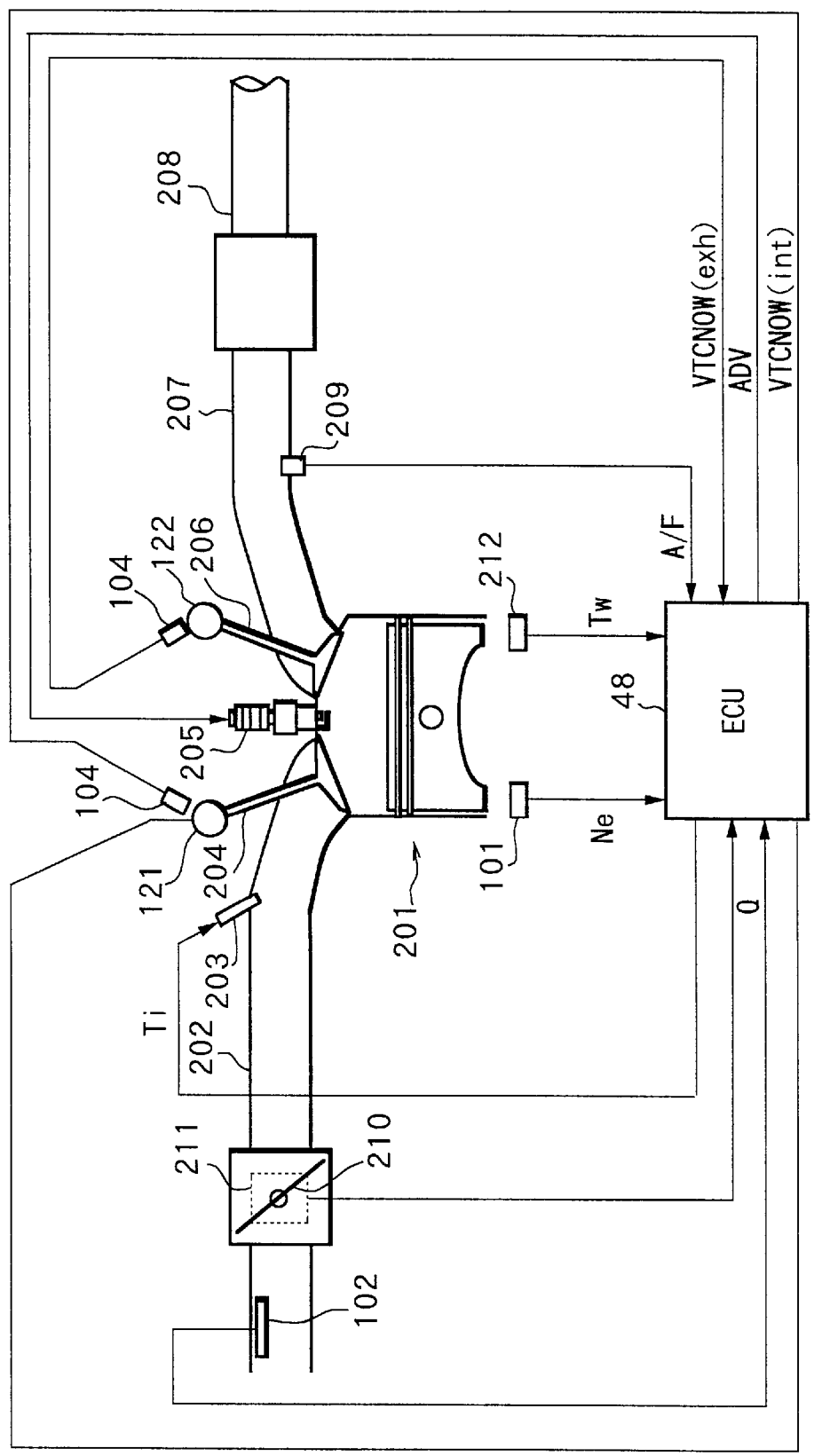
FIG. 7 is a diagram showing a system structure of an engine equipped with the above variable valve timing mechanism.

FIG. 7 shows a system structure of an engine equipped with the above-mentioned variable valve timing mechanism.

In the drawing, variable valve timing mechanism (VTC) 121 is disposed only to the intake valve side. A fuel injection valve 203 is provided in an intake passage 202 of an engine 201, for injecting fuel to an intake port of each cylinder, and the fuel injected from fuel injection valve 203 is pre-mixed with air and drawn into the cylinder through an intake valve 204. The combustion mixture within the cylinder is ignited to burn by spark ignition performed by an ignition plug 205, and the combustion exhaust is discharged through an exhaust valve 206 to an exhaust passage 207.

Exhaust passage 207 is disposed with a ternary catalyst 208 that purifies CO, HC and NOx within the exhaust.

On the upstream side of ternary catalyst 208 is disposed an air-fuel ratio sensor 209 that has a characteristic to change an output value thereof corresponding to a change in exhaust air-fuel ratio, to detect the air-fuel ratio.

Further, intake passage 202 is disposed with a throttle valve 210 that controls an intake air amount, and a throttle sensor 211 that detects an opening of throttle valve 210, and on the upstream side of throttle valve 210 and throttle sensor 211, an airflow meter 102 that detects the intake air amount is disposed. Other than the above, a water temperature sensor 212 that detects the engine cooling water temperature Tw is disposed.

Detection signals from various sensors mentioned above are input to ECU 48, and ECU 48 performs a valve timing control of intake valve 204 by VTC 121, and also a control of fuel injection quantity injected by fuel injection valve 203, and a control of ignition by ignition plug 205.

The fuel injection quantity control including the transient correction according to the present invention will now be explained referring to flowcharts starting from FIG. 8.

Figure 8:
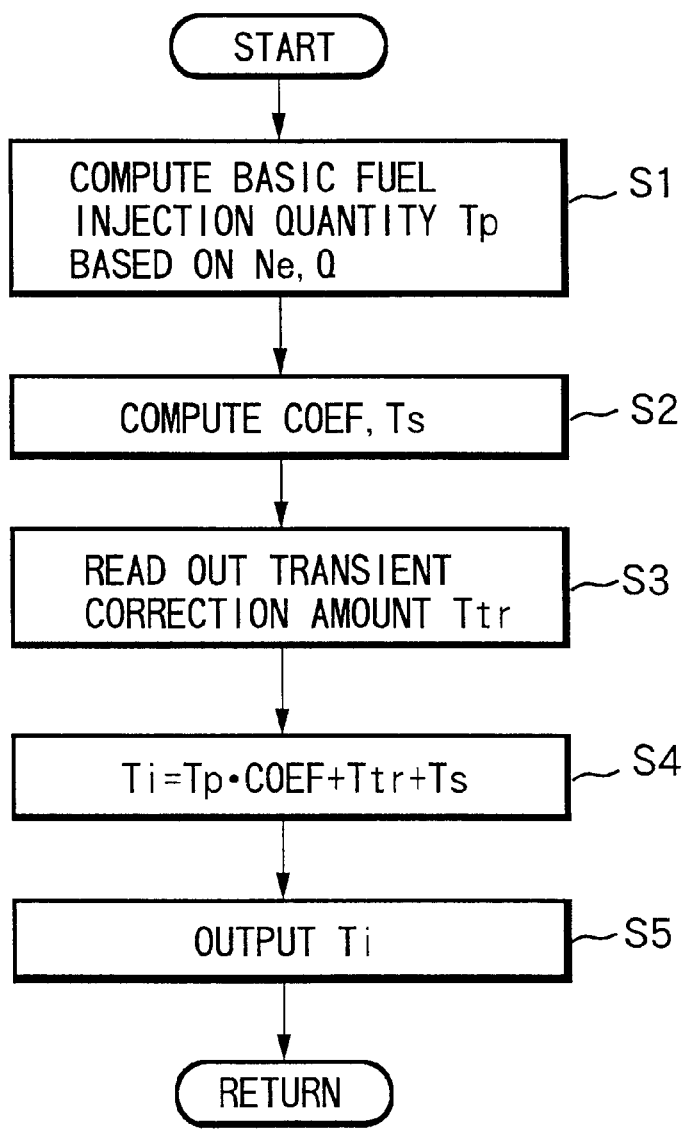
FIG. 8 is a flowchart showing the main routine of fuel injection quantity control of the above engine.

In FIG. 8 showing the main routine of the fuel injection quantity control, in step 1, a basic fuel injection quantity Tp is computed based on an engine rotation speed Ne detected by crank angle sensor 101 and an intake airflow quantity Q detected by airflow meter 102.

In step 2, various correction coefficients COEF based on water temperature etc. and a reactive pulse component Ts corresponding to a battery voltage are set.

In step 3, a transient correction amount Ttr computed by a separate routine is read in.

In step 4, a final fuel injection quantity (fuel injection quantity pulse width) Ti is computed from the following equation.

$$Ti = Tp \cdot COEF + Ttr + Ts$$

In step 5, an injection pulse signal for fuel injection quantity Ti is output to fuel injection valve 203, thereby performing the fuel injection quantity control.

Figure 9:
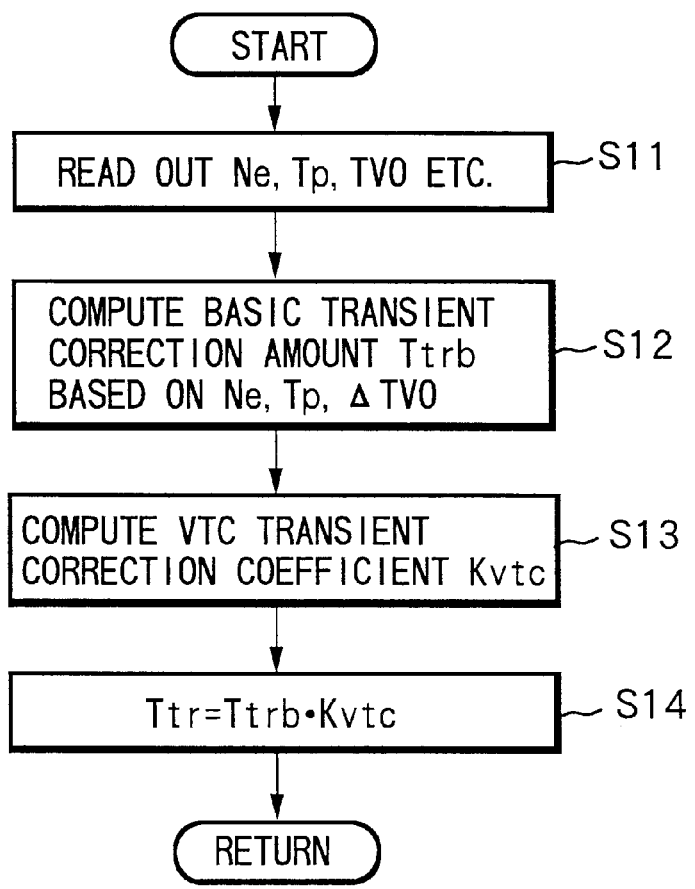
FIG. 9 is a flowchart showing the subroutine for computing a transient correction amount Ttr of the fuel injection quantity.

FIG. 9 is a flowchart of a routine for computing transient correction amount Ttr to be read in step 3.

In step 11, the engine rotation speed Ne, fuel injection quantity Tp (load), throttle valve opening TVO, etc. are read in.

In step 12, a basic transient correction amount Ttrb is computed based on the engine rotation speed Ne, the basic fuel injection quantity Tp, a change ratio ΔTVO of throttle valve opening TVO, etc. Here, the basic transient correction amount Ttrb is set so as to include an influence of a change in valve timing to be controlled variably by the variable valve timing mechanism (VTC) according to a change in operating condition etc., and specifically, is set coping with a change in fuel wall flow of the intake port when the valve timing is controlled without delay to a target valve timing.

In step 13, a VTC transient correction coefficient Kvtc corresponding to a change in state of valve overlap amount is computed.

A subroutine for computing the VTC transient correction coefficient Kvtc will now be explained with reference to FIG. 10.

In step 21, the actual angle VTCNOW of the variable valve timing mechanism (VTC) and the target angle VTCTRG are read in.

In step 22, the deviation VTCERR (=VTCNOW−VTCTRG) between actual angle VTCNOW and target angle VTCTRG is computed.

Figure 11:
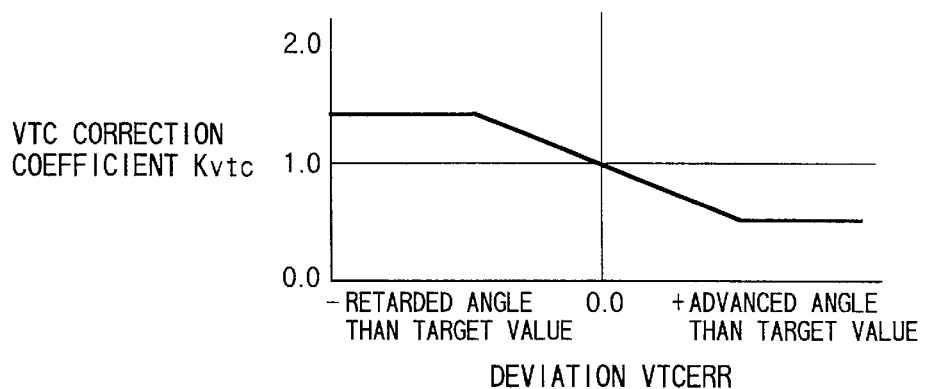
FIG. 11 is a map set with the VTC transient correction coefficient Kvtc.

In step 23, the above-mentioned VTC transient correction coefficient Kvtc is searched from a characteristic table as previously shown in FIG. 11 based on the deviation VTCERR.

Figure 12:
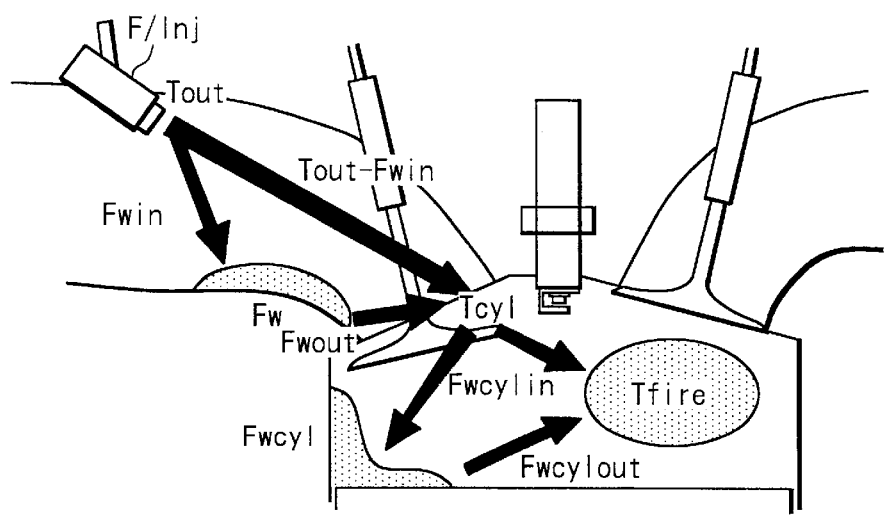
FIG. 12 is a diagram for explaining a change in state of injected fuel.

Now, a relation between the valve overlap amount and the fuel wall flow is explained referring to FIG. 12. First, a part of fuel Tout injected from fuel injection valve 203, is adhered to the intake port wall to become a port wall flow Fw, and a part of the fuel flowing into the cylinder is adhered to the cylinder wall to become a cylinder wall flow Fcyl, but out of these two wall flows, the port wall flow Fw is greatly influenced by the valve overlap amount. In other words, as for the cylinder wall flow Fcyl, when the exhaust gas blows from the exhaust port toward the intake port during valve overlapping, the inside of the cylinder is exposed to combustion gas so the cylinder wall temperature does not change greatly. On the other hand, if the blown amount of exhaust gas during valve overlapping is increased, the intake port wall is heated by the blown exhaust gas and the port wall temperature rises greatly, and the collision of the blown exhaust gas with the port wall flow accelerates the atomization of wall flow fuel, thus increasing the fuel evaporation rate "p" of the port wall flow. The longer the valve overlapping period is, the greater the exhaust gas blow quantity becomes, thus increasing the fuel evaporation rate "p" of the port wall flow to reduce the port wall flow amount Fw.

As in the present embodiment, in the case where VTC is provided only to the intake valve side, if the actual angle VTCNOW is advanced (delayed) than the target angle VTCTRG, the actual valve overlap amount is greater (smaller) than the target valve overlap amount. As the actual valve overlap amount is relatively greater (smaller), the exhaust gas blow amount becomes relatively greater (smaller), and the port wall flow amount Fw becomes greater (smaller) than a value corresponding to the target valve overlap amount.

Therefore, as mentioned above, as the deviation VTCERR is greater in a positive (negative) value, in other words, as the actual valve overlap amount is greater (smaller) than the target valve overlap amount, the VTC transient correction coefficient Kvtc is set to a smaller (greater) value than value 1 without the correction corresponding to the deviation VTCERR=0, so as to reduce (increase) the fuel injection quantity corresponding to the reduction (increase) of port wall flow amount Fw.

Figure 10:
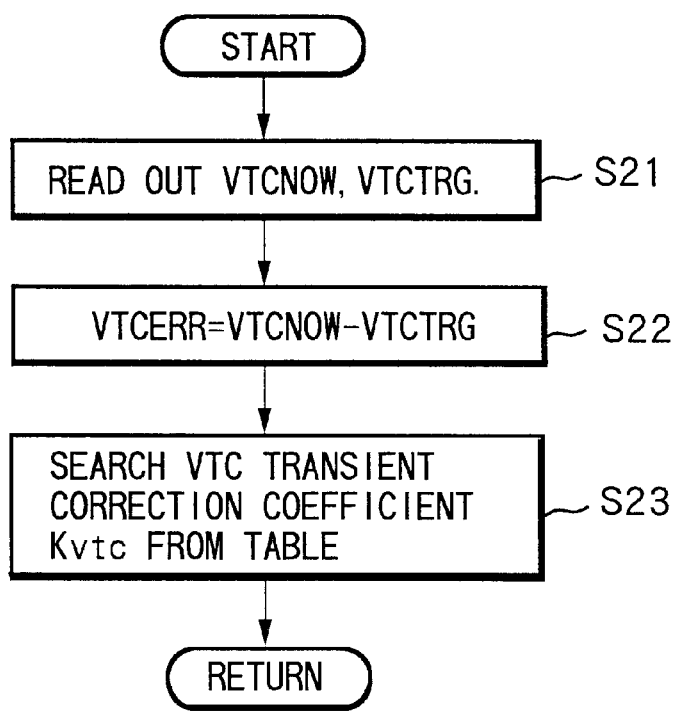
FIG. 10 is a flowchart showing the subroutine for computing a VTC transient correction coefficient Kvtc used for computing the above transient correction amount Ttr.

Returning to FIG. 9, in step 14, a final transient correction amount Ttr is computed using the following equation based on the basic transient correction amount Ttrb computed in step 12 and the VTC transient correction coefficient Kvtc computed in step 13, that is, in the subroutine of FIG. 10.

Transient correction amount Ttr=Basic transient correction amount Ttrb×VTC transient correction coefficient Kvtc In this way, when the valve overlap amount is changed by the VTC control during transient operation, the transient correction amount can be corrected appropriately to the response delay of the valve timing control, thus preventing lean/rich of air-fuel ratio during transient operation, ensuring the stable transient operating performance, and further ensuring the satisfactory exhaust emission reduction performance.

Figure 13:
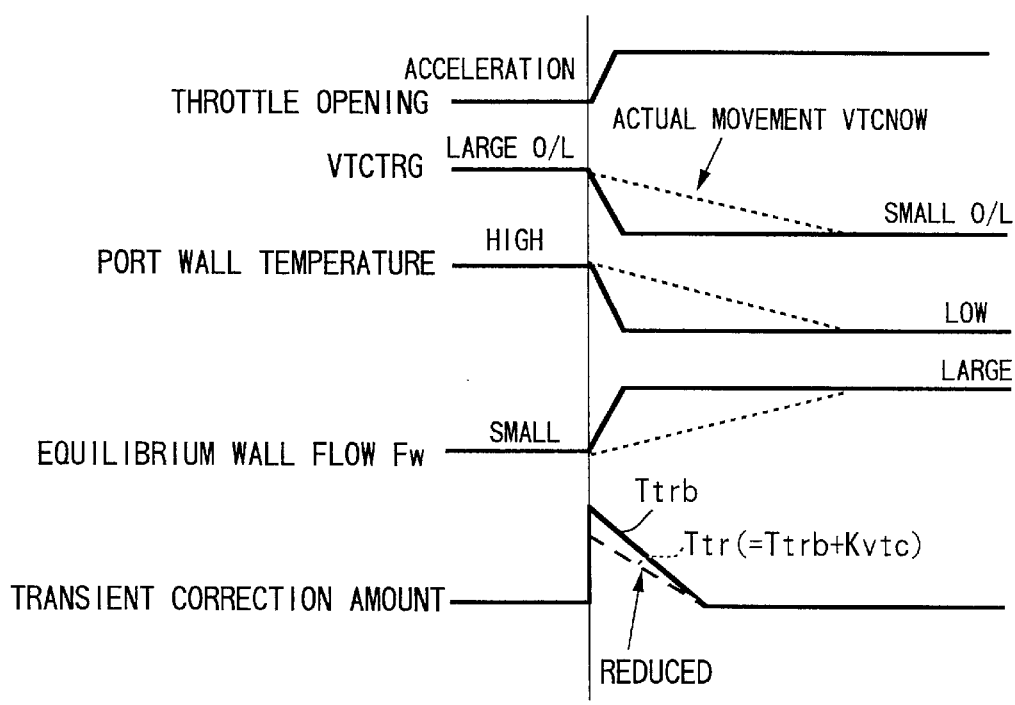
FIG. 13 is a time chart showing changes in various states during acceleration according to a first embodiment.

FIG. 13 shows changes in various states during engine acceleration.

Further, according to the above-mentioned embodiment, the engine having the VTC disposed only to the intake valve side has been shown, however, as shown by a chain single-dashed line in FIG. 7, the embodiment can be applied to an engine also having a VTC 122 disposed to the exhaust valve side as well. The basic idea of the present invention is also applied to such a constitution.

Figure 14:
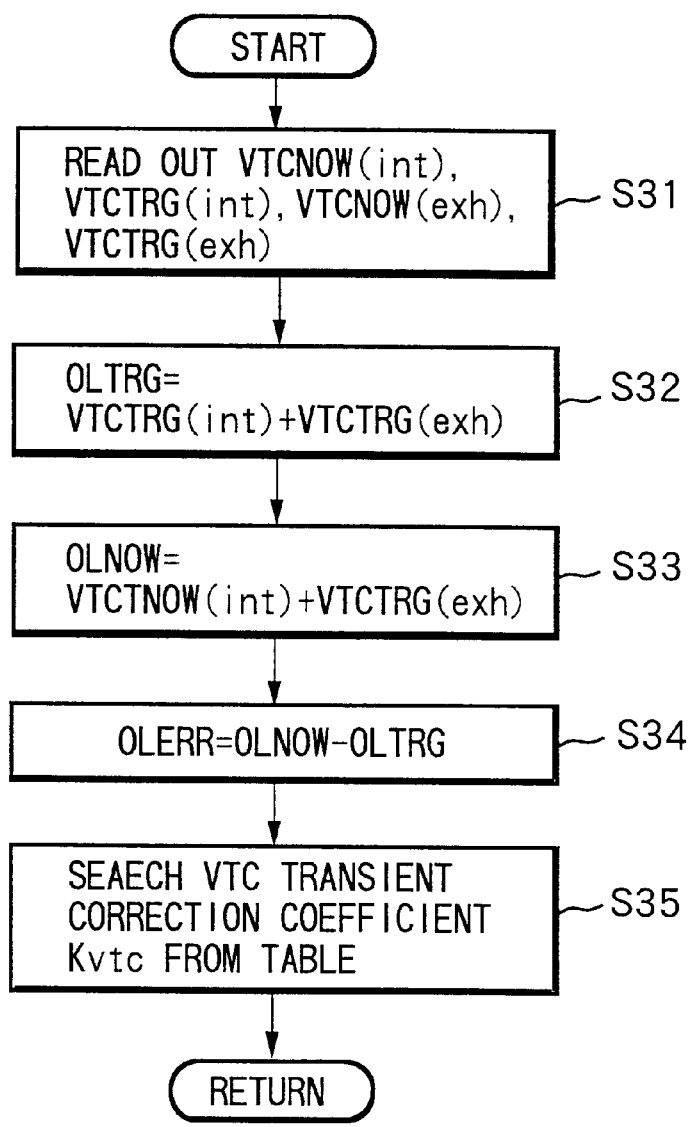
FIG. 14 is a flowchart showing the subroutine for computing the VTC transient correction coefficient Kvtc used for computing the transient correction amount Ttr in a second embodiment.

Referring to the flowchart of FIG. 14, there will be explained the computation of VTC transient correction coefficient Kvtc in a second embodiment of the present invention wherein the engine is disposed with VTCs to both the intake valve side and the exhaust valve side,.

In step 31, an intake valve side target opening VTCTRG (int) and an actual opening VTCNOW (int), and an exhaust valve side target opening VTCTRG (exh) and an actual opening VTCNOW (exh) are read in.

In step 32, a target valve overlap amount OLTRG is computed by the following equation.

OLTRG=VTCTRG(int)+VTCTRG(exh)+OFFSET wherein OFFSET is an initial valve overlap amount during the non-operating of VTC, VTCTRG (int), VTCNOW (int), VTCTRG (exh), VTCNOW (exh) are each set so that the direction for increasing the valve overlap amount OLTRG, that is, toward the delay angle direction in the intake valve side while toward the advance angle direction in the exhaust valve side, is the positive value.

In step 33, the actual valve overlap amount OLNOW is computed by the following equation.

OLNOW=VTCNOW(int)+VTCNOW(exh)+OFFSET

In step 34, the deviation OLERR between the target valve overlap amount OLTRG and the actual valve overlap amount OLNOW is computed by the following equation.

OLERR=OLNOW−OLTRG

Figure 15:
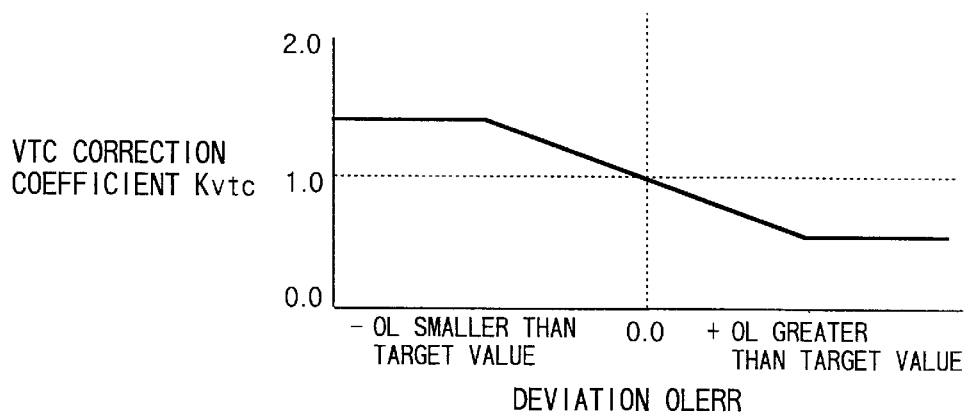
FIG. 15 is a map set with the VTC transient correction coefficient in the second embodiment.

In step 35, based on the above-mentioned deviation OLERR, the VTC transient correction coefficient Kvtc is searched from a characteristic table as previously shown in FIG. 15. From reasons already stated, the VTC transient correction coefficient Kvtc is set similarly as shown in FIG. 11.

In the above embodiments, since the transient correction amount is corrected based on the deviation of the actual valve overlap amount from the target valve overlap amount, the correction can be performed by a simple operation. However, the transient correction amount can also be corrected based on the deviation from a reference response characteristic (response delay). For example, a primary delay operation and the like is performed on the target valve overlap amount to obtain a reference valve overlap amount corresponding to the reference response characteristic (response delay), and based on the deviation of the actual valve overlap amount from the reference valve overlap amount, the VTC transient correction coefficient Kvtc is computed and corrected. In this way, the basic transient correction amount (which is the feedforward value) can be set to a value approximate the actual response characteristic, and therefore, the transient correction amount can be set with higher accuracy.

The entire contents of basic Japanese Patent Application, No. 2001-078197 filed on Mar. 19, 2001, a priority of which is claimed, are herein incorporated by reference.

What is claimed is:

1. A fuel injection control apparatus of an engine equipped with a variable valve timing mechanism that controls the valve timing of at least one of an intake valve and an exhaust valve, comprising:

a valve timing detector that detects the valve timing controlled by said variable valve timing mechanism; and a fuel injection controller that inputs with a signal from said valve timing detector to detect a state in which the valve timing is switched by said valve timing mechanism, computes a valve overlap amount of the intake/exhaust valves when the valve timing is being switched, corrects a transient correction amount of fuel being supplied to the engine based on the computation value of said valve overlap amount, corrects and computes a fuel injection quantity by said corrected transient correction amount, and outputs a signal for said fuel injection quantity to a fuel injection valve.

2. A fuel injection control apparatus of an engine according to claim 1, wherein said fuel injection controller corrects said transient correction amount according to the deviation between a target valve overlap amount and an actual valve overlap amount.

3. A fuel injection control apparatus of an engine according to claim 2,
wherein said fuel injection controller increases a correction amount of said transient correction amount as the deviation between said target valve overlap amount and the actual valve overlap amount is greater.

4. A fuel injection control apparatus of an engine according to claim 2,
wherein said fuel injection controller corrects the transient correction amount to be reduced when the actual valve overlap amount is greater than the target valve overlap amount, and corrects the transient correction amount to be increased when the actual valve overlap amount is smaller than the target valve overlap amount.

5. A fuel injection control apparatus of an engine according to claim 1,
wherein said fuel injection controller corrects a basic value of the transient correction amount computed based on a parameter of transient operating condition of the engine with the correction value computed based on a change in state of said valve overlap amount.

6. A fuel injection control apparatus of an engine according to claim 1,
wherein said variable valve timing mechanism variably controls only the valve timing of the intake valve.

7. A fuel injection control apparatus of an engine according to claim 1,
wherein said variable valve timing control mechanism variably controls the valve timing of the intake valve and the valve timing of the exhaust valve, independently.

8. A fuel injection control apparatus of an engine according to claim 1,
wherein said variable valve timing control mechanism variably controls the valve timing successively by changing a rotation phase of a camshaft relative a crankshaft.

9. A fuel injection control apparatus of an engine according to claim 1,
wherein said fuel injection control apparatus is applied to an engine in which fuel is mainly injected to an intake port.

10. A fuel injection control apparatus of an engine equipped with a variable valve timing mechanism that controls the valve timing of at least one of an intake valve and an exhaust valve, comprising:
valve timing detecting means for detecting the valve timing controlled by said variable valve timing mechanism;
valve timing switching state detecting means for inputting with a signal from said valve timing detecting means to detect a state in which the valve timing is switched by said valve timing mechanism;
valve overlap amount computing means for computing a valve overlap amount of the intake/exhaust valves when the valve timing is being switched;
transient correction amount correcting means for correcting a transient correction amount of fuel being supplied to the engine based on the computation value of said valve overlap amount;
fuel injection quantity computing means for correcting and computing a fuel injection quantity by said corrected transient correction amount; and
fuel injection valve driving means for outputting a signal for said fuel injection quantity to a fuel injection valve to drive said fuel injection valve.

11. A fuel injection control method of an engine equipped with a variable valve timing mechanism that controls the valve timing of at least one of an intake valve and an exhaust valve,
wherein the valve timing controlled by said variable valve timing mechanism is detected,
a signal from a valve timing detector is input to detect a state in which the valve timing is switched by said valve timing mechanism,
a valve overlap amount of the intake/exhaust valves when the valve timing is being switched is computed,
a transient correction amount of fuel being supplied to the engine is corrected based on the computation value of said valve overlap amount,
a fuel injection quantity is corrected and computed by said corrected transient correction amount, and
a signal for said fuel injection quantity is output to a fuel injection valve to drive said fuel injection valve.

12. A fuel injection control method of an engine according to claim 11,
wherein said transient correction amount is corrected according to the deviation between a target valve overlap amount and an actual valve overlap amount.

13. A fuel injection control method of an engine according to claim 12,
wherein a correction amount of said transient correction amount is increased as the deviation between said target valve overlap amount and the actual valve overlap amount is greater.

14. A fuel injection control method of an engine according to claim 12,
wherein the transient correction amount is corrected to be reduced when the actual valve overlap amount is greater than the target valve overlap amount, and corrected to be increased when the actual valve overlap amount is smaller than the target valve overlap amount.

15. A fuel injection control method of an engine according to claim 11,
wherein a basic value of the transient correction amount computed based on a parameter of transient operating condition of the engine is corrected with the correction value computed based on a change in state of said valve overlap amount.

16. A fuel injection control method of an engine according to claim 11,
wherein said variable valve timing mechanism variably controls only the valve timing of the intake valve.

17. A fuel injection control method of an engine according to claim 11,
wherein said variable valve timing control mechanism variably controls the valve timing of the intake valve and the valve timing of the exhaust valve, independently.

18. A fuel injection control method of an engine according to claim 11,
wherein said variable valve timing control mechanism variably controls the valve timing successively by changing a rotation phase of a camshaft relative a crankshaft.

19. A fuel injection control method of an engine according to claim 11,
wherein said fuel injection control method is applied to an engine in which fuel is mainly injected to an intake port.

* * * * *